United States Patent [19]
Robichon et al.

[11] Patent Number: 6,013,702
[45] Date of Patent: Jan. 11, 2000

[54] PROCESS FOR MANUFACTURING A COMPOSITION WHICH CAN BE USED FOR THE PRODUCTION OF STOPPERS, COMPOSITION AND STOPPER COMPRISING SUCH A COMPOSITION

[75] Inventors: Patrice Robichon, Chatou; Philippe Noble, Beziers, both of France

[73] Assignee: Pernod Ricard, Paris, France

[21] Appl. No.: 09/106,261

[22] Filed: Jun. 29, 1998

[30] Foreign Application Priority Data

Jun. 27, 1997 [FR] France .................................. 97 08111

[51] Int. Cl.⁷ .............................. B27J 5/00; C08L 97/00
[52] U.S. Cl. ........................... 524/16; 215/355; 215/363; 106/165.01
[58] Field of Search ............................. 524/16; 215/355, 215/363, 364; 106/165.01

[56] References Cited

U.S. PATENT DOCUMENTS 1,455,762  5/1923  Howard .

FOREIGN PATENT DOCUMENTS 2 672 002 A1  1/1991  France .
8 902 394     4/1991  Netherlands .

Primary Examiner—Nathan M. Nutter
Attorney, Agent, or Firm—Jacobson, Price, Holman & Stern, PLLC

[57] ABSTRACT

The invention relates to a process for manufacturing a composition which can be used for producing stoppers.

According to the invention, it comprises the following steps:
  a) sheets of cork are ground into small-sized granules,
  b) said cork granules are decomposed into granules having a high lignin content and into granules having a high suberin content, and
  c) the lignin-rich granules are separated from the suberin-rich granules in order to keep only the suberin-rich granules in said composition.

The invention also relates to a composition comprising suberin-rich cork granules as well as to a stopper comprising such a composition.

18 Claims, No Drawings

PROCESS FOR MANUFACTURING A COMPOSITION WHICH CAN BE USED FOR THE PRODUCTION OF STOPPERS, COMPOSITION AND STOPPER COMPRISING SUCH A COMPOSITION

The present invention relates in a general way to the manufacture of cork-based stoppers, and more particularly to a process for manufacturing a composition which can be used for the production of stoppers.

It also relates to such a composition and to a stopper comprising this composition, the stopper being intended to seal bottles of alcoholic or nonalcoholic drinks such as, for example, wines, still or effervescent drinks, spirits, ciders and carbonated drinks containing fruits.

Cork, from which the stoppers are manufactured, is a plant tissue produced by the phellogen of cork oak. It consists of dead cells having an alveolar structure. These cells are filled with gas, the composition of which is very close to that of air.

Cork is essentially composed of approximately 45% suberin, which is the main constituent of the alveolar cells, approximately 27% lignin of fibrous structure, which is found as inclusions in channels or at the surface of the bark, approximately 12% cellulose and approximately 17% various other products, such as ceroids, tannins, inorganic substances and water.

Cork is a good material for stopping and preserving still or effervescent drinks, especially wines or other bottled alcohols, as it is a compressible substance which is sufficiently elastic, impermeable and hydrophobic. Cork contains approximately 5% moisture, but hydrates slowly. It is just gas-impermeable enough to allow wines or alcohols to age correctly without oxidizing.

However, cork is a natural substance which has defects of a greater or lesser extent.

These defects mostly consist of channels having lignified walls or of lignin inclusions.

They have a deleterious effect on the elasticity and impermeability of the stopper. Furthermore, they contain substances, or their precursors, which, during ageing, may give the stoppered wines or alcohols an undesirable taste called "cork taste".

Approximately 7 quality categories for cork-based stoppers may be distinguished, these being distributed over a scale ranging from 0 for the best quality of cork, virtually free of defects, up to 6 for the lowest quality of cork, having a high proportion of defects.

In order to try to eliminate the abovementioned drawbacks associated with the defects of natural cork of medium- and low-quality while at the same time maintaining a relatively low cost of manufacturing the stoppers, compared with the solution which consists in manufacturing the stoppers from a high-quality natural cork free from defects, stopper manufacturers have produced agglomerated stoppers consisting of medium- or low-quality cork particles and of a binder or adhesive which provides the stoppers with cohesion.

Composite stoppers, an example of which is described in document FR 2,672,002, are also known.

Such a stopper consists mainly of a powder of a ligneous plant substance, coming especially from cork, of expanded plastic microspheres and of a food-grade adhesive.

However, agglomerated stoppers, although they are economical to manufacture, have physicochemical and mechanical properties which are significantly inferior to those of stoppers made of natural cork and they cannot therefore be used for the preservation of wines or alcohols intended to undergo in-bottle ageing.

In addition, just like the aforementioned composite stoppers, the use of agglomerated stoppers does not prevent a cork taste from being formed in wines and alcohols bottled and stoppered using such stoppers.

In order to alleviate the aforementioned draw-backs, the present invention provides a novel process for manufacturing a composition which can be used for the production of stoppers, such a composition making it possible, in particular, to eliminate the risks of a cork taste forming in bottled alcohols.

More particularly, the process according to the invention comprises the following steps:

a) sheets of cork are ground into small-sized granules,
b) said cork granules are decomposed into granules having a high lignin content and into granules having a high suberin content, and
c) the lignin-rich granules are separated from the suberin-rich granules in order to keep only the suberin-rich granules in said composition.

Several studies have made it possible to identify certain substances, contained in the cork from which the stoppers are produced, which adversely affect the wine, and giving it a cork taste.

The main substances identified are:
2,4,6-trichloroanisole (2,4-TCA)
2,5-dimethylpyrazine
2-methylthio-3-ethylpyrazine
4-ethylphenol
2,6-dichlorophenol
geosmin
guaiacol
1-octen-3-one
1-octen-3-ol
2-methylisoborneol.

These aforementioned substances, even at low concentrations, give the wine unacceptable flavors.

These substances, or their precursors, are localized in the ligneous parts of the cork. Thus, the trichloroanisole content in cork increases on going toward the bark of the cork oak (lignified part). Guaiacol is produced by the action of bacteria on lignin. The other aforementioned substances are, as precursors, the tannins, bacteria or molds which are preferentially found in the lignin or lignified channels.

Thus, according to the invention, a composition is produced which can be used for the manufacture of almost lignin-free stoppers. As will be explained later with the aid of test results, the stoppers produced from such a composition and used to stopper bottles of wines or alcohols therefore in no way transmit an unpleasant taste, the so-called cork taste, to the aged wines and alcohols.

According to one characteristic of the process according to the invention, the cork granules obtained in step a) by grinding have a size of between 3 and 8 mm.

According to a preferred way of implementing the process according to the invention, the cork granules are decomposed in step b) by means of shock waves propagating within said granules, the velocity of propagation of said shock waves being different in the compounds of different density.

This method of decomposition by shock waves can be envisaged here since suberin and lignin have different densities.

Advantageously, according to the invention, the shock waves may be produced by means of a plasma created in an aqueous medium.

To do this, one method consists in immersing the cork granules to be decomposed in an aqueous medium constituting the medium for propagating the shock waves into said granules.

This method is as follows.

The cork granules obtained by grinding are placed in a specimen chamber (the dimensions of an experimental pilot of which are: height equal to approximately 40 mm and diameter equal to approximately 200 mm) and this specimen chamber is put under compression in a water-filled tank. An electric arc is created in the water contained in the tank by charging up capacitors and then by releasing the stored capacitive energy in the form of pulsed discharges. The electric arc created between the two poles of an electrode dipped in the water results in the formation of a plasma which induces the shock waves, these propagating at different velocities in the compounds of different density of the cork granules.

The mechanical stresses generated by the passage of the shock waves at the boundary between two different compounds, in this case suberin and lignin, allow them to separate.

The medium for propagating the shock waves into the cork granules to be decomposed may also be air instead of water.

In this case, the shock waves will be transmitted to the granules via a flexible membrane which separates them from the electrode, which is always placed in an aqueous medium for the purpose of forming the plasma which generates said waves.

According to other ways of implementing the process according to the invention, the shock waves may be produced by explosion or decompression.

According to other characteristics of the process according to the invention, the suberin-rich granules may be separated from the lignin-rich granules in step c) by flotation or by centrifuging or else by diffusion.

The process according to the invention advantageously comprises an additional step consisting in mixing the isolated suberin-rich granules with a binder which may be, for example, a food-grade adhesive of the polyurethane or acrylic type.

The invention also relates to a composition produced using the aforementioned process according to the invention, which can be used for the manufacture of stoppers and comprises suberin-rich granules.

Various tests have been carried out on three batches of different granules.

The first batch, A, comprises initial cork granules obtained by grinding (standard cork).

The second batch, S, comprises suberin-rich granules obtained according to the aforementioned process for the composition according to the invention.

The third batch, L, comprises the waste from the process according to the invention, i.e. the lignin-rich granules.

A density measurement and a chemical analysis were carried out on the three batches of different granules. The chemical analysis consists in oxidizing the granules of the various batches with nitrobenzene and in measuring the concentration of the degradation products resulting from the oxidation and more particularly the lignin concentration expressed in syringaldehyde which, in all probability, comes exclusively from the degradation of the lignin.

Furthermore, organoleptic analysis was carried out on the granules of the various batches by maceration in a neutral white wine.

The results of the various measurements and analyses are given in Table 1 below.

TABLE 1

|  | Batch S | Batch A | Batch L |
| --- | --- | --- | --- |
| Density (kg/m$^3$) | 89.1 | 127.5 | 131 |
|  | (−30%) |  | (+2.8%) |
| Taste | 1.8 | 3.5 | 5.2 |
| Chemical analysis; | 0.46 | 0.54 | 0.66 |
| concentration | (−14.8%) |  | (+22.2%) |
| (g/l) of |  |  |  |
| syringaldehyde |  |  |  |

NB: the percentages in the table are given with respect to batch A.

* The organoleptic analysis was carried out with respect to a batch of standard agglomerated cork stoppers.

It is apparent from Table 1 that the granules of batch S (which are rich in suberin) have a density of less than 90 kg/m$^3$ and a lignin concentration expressed in syringaldehyde of about 0.46 g/l, this being approximately 15% less than that of the initial cork granules of batch A. These two results clearly show that the granules of batch S, which are those of the composition according to the invention, have a high suberin content (a suberin concentration close to 100%).

In contrast, the granules of batch L have a density of about 131 kg/M$^3$, this being greater than the density of the initial cork granules. Their lignin concentration, expressed in syringaldehyde, is about 0.66 g/l, this being approximately 22% greater than that of the initial cork granules. This clearly shows that the granules of batch L have a high lignin content.

It will be noted that the results of the chemical analysis, in particular the lignin concentration expressed in syringaldehyde, depend, of course, on the lignin concentration of the initial batch of standard cork granules.

Thus, the syringaldehyde concentration values indicated for batches S and L in Table 1 are not significant in the absolute sense but must be compared with the syringaldehyde concentration value indicated for the initial batch A.

The same chemical analysis was carried out on other batches of suberin-rich granules obtained using the process according to the invention from various standard cork batches.

The results of the analysis obtained make it possible to state that, in a batch of granules enriched with suberin by the process according to the invention, the lignin concentration (expressed in syringaldehyde) has been reduced by an amount of between 15% and 50% with respect to the lignin concentration of the initial standard cork granules, while the lignin concentration (expressed in syringaldehyde) of the waste batch increased by an amount of between 20% and 100% with respect to the syringaldehyde concentration of the initial cork granules.

With regard to the organoleptic test, the ratings appearing in Table 1 were given in order to indicate the closeness of the specimen of granules in question with a control having the value 0 (neutral white wine alone).

As the results in Table 1 show, the granules of batch S are close to the control—a neutral taste. The granules of batch L are very different from the control, with an earthy, musty and dusty rating. The granules of batch A are in an intermediate position, with a powdered cork rating.

It is therefore apparent that the suberin-rich granules obtained by the process according to the invention and forming part of the composition according to the invention have organoleptic characteristics markedly superior to those of the granules of batch L which are the lignin-rich waste granules.

Moreover, in the composition according to the invention, the suberin-rich granules are advantageously mixed with a binder which is preferably a food-grade adhesive of the polyurethane or acrylic type. Thus, the stoppers manufactured from such a composition have good mechanical and sealing properties.

The cost of implementing the process according to the invention in order to obtain said composition for producing stoppers is reasonable.

We claim:

1. A process for manufacturing a composition which can be used for the production of stoppers, which comprises the following steps:

a) sheets of cork are ground into small-sized granules, b) said cork granules are decomposed into granules having a high lignin content and into granules having a high suberin content, and c) the lignin-rich granules are separated from the suberin-rich granules in order to keep only the suberin-rich granules in said composition.

2. The process as claimed in claim 1, wherein the cork granules obtained in step a) by grinding have a size of between 3 and 8 mm.

3. The process as claimed in claim 1, wherein the cork granules are decomposed in step b) by means of shock waves propagating within said granules, the velocity of propagation of said shock waves being different in the compounds of different density.

4. The process as claimed in claim 3, wherein the shock waves are produced by means of a plasma created in an aqueous medium.

5. The process as claimed in claim 4, wherein the medium for propagating the shock waves into the cork granules is the aqueous medium itself in which said granules are immersed.

6. The process as claimed in claim 4, wherein the medium for propagating the shock waves into the cork granules is air, the shock waves being transmitted to the granules via a flexible membrane which separates them from an electrode placed in the aqueous medium for the purpose of forming the plasma which generates said waves.

7. The process as claimed in claim 3, wherein the shock waves are produced by explosion.

8. The process as claimed in claim 3, wherein the shock waves are produced by decompression.

9. The process as claimed in claim 1 wherein separation step c) is carried out by flotation.

10. The process according to claim 1 wherein separation step c) is carried out by centrifuging.

11. The process as claimed in claim 1, wherein separation step c) is carried out by diffusion.

12. The process as claimed in claim 1, which comprises an additional step consisting in mixing the isolated suberin-rich granules with a binder.

13. A composition produced using the process as claimed in claim 1, which can be used for the manufacture of stoppers, which comprises suberin-rich granules.

14. The composition as claimed in claim 13, wherein said suberin-rich granules have a density of less than 90 kg/m$^3$.

15. The composition as claimed in claim 13, wherein said suberin-rich granules are mixed with a binder.

16. The composition as claimed in claim 15, wherein the binder is a polyurethane or acrylic food-grade adhesive.

17. A stopper intended to seal bottles of still or effervescent alcoholic drinks or of carbonated drinks, which comprises the composition as claimed in claim 13.

18. The process according to claim 12, wherein the binder is a polyurethane or acrylic food-grade adhesive.

* * * * *